July 28, 1931. G. E. SMITH 1,816,445
STEERING WHEEL AND METHOD OF MAKING THE SAME
Filed May 12, 1928   2 Sheets-Sheet 1

INVENTOR
Grant E. Smith
BY
Emery, Booth, Janney & Varney
ATTORNEYS

July 28, 1931.  G. E. SMITH  1,816,445
STEERING WHEEL AND METHOD OF MAKING THE SAME
Filed May 12, 1928  2 Sheets-Sheet 2
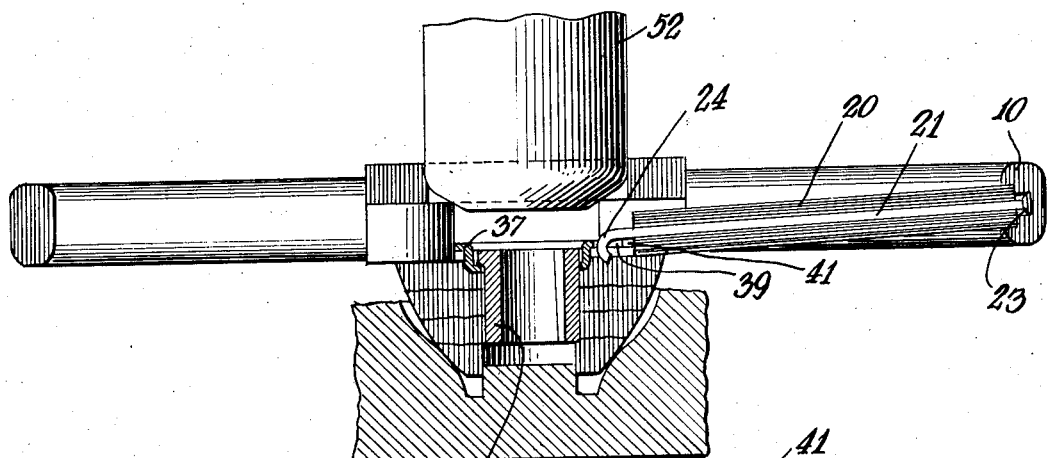
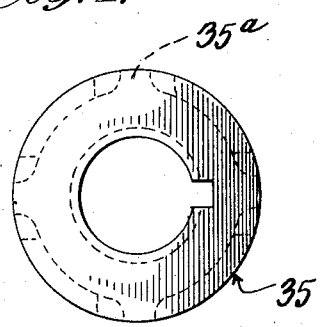
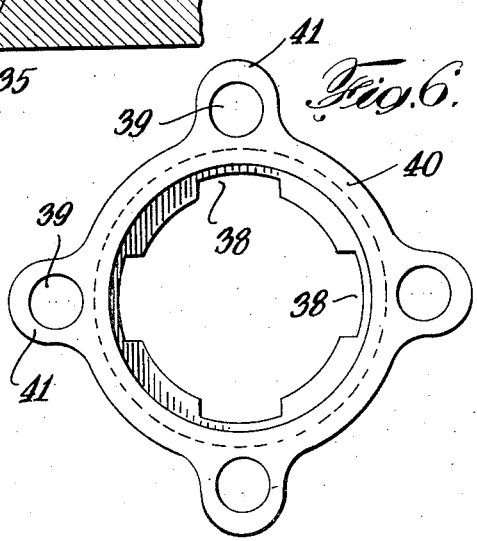
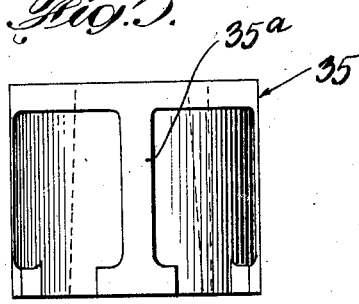
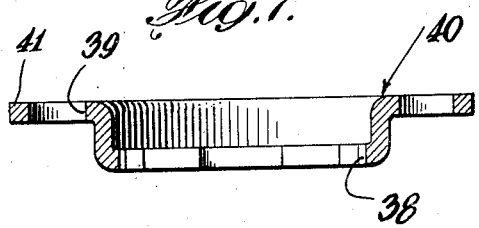
INVENTOR.
Grant E. Smith
BY
Emery, Booth, Janney & Varney
ATTORNEYS.

Patented July 28, 1931

1,816,445

UNITED STATES PATENT OFFICE

GRANT E. SMITH, OF POUGHKEEPSIE, NEW YORK, ASSIGNOR TO POUVAILSMITH CORPORATION, OF POUGHKEEPSIE, NEW YORK, A CORPORATION OF NEW YORK

STEERING WHEEL AND METHOD OF MAKING THE SAME

Application filed May 12, 1928. Serial No. 277,185.

The present invention relates to wheels and to the manufacture thereof and has for an object the provision of a molded wheel which will be strong, durable and attractive and one which may be economically and expeditiously manufactured. Inasmuch as the invention has been developed in connection with the manufacture of steering wheels for automobiles, such an embodiment has been selected for illustration and description herein.

The invention concerns the manufacture of wheels wherein the rim, spokes and hub are molded as an integral unit, for example, from blanks of fibrous or other moldable material with suitable impregnating or coating adhesive or curing compounds as desired, which are assembled and subsequently compressed in molds under heat and pressure to form a wheel.

In order to house certain mechanisms or parts associated with the steering wheel and at the same time preserve its attractive appearance, it is desirable to provide a relatively large recess in the hub of the wheel adjacent the inner ends of the spokes in order that the related mechanism or parts may, when set in place, come substantially flush with the upper surface of the wheel. In such cases it becomes necessary to form an axial extension below the recess which will provide means comprising, for example, a metallic bushing for attaching the wheel to a steering shaft or other shaft as may be required. In such a construction it is desirable that reinforcing members be used in order to give the wheel additional strength at those points which would be found relatively weak were the molded material alone used. Specifically, it is desirable to have such reinforcement as will take a substantial portion of the strain received by the bushing and transmit the same to the rim of the wheel, preferably by a member or members extending from the bushing through the spokes into the rim and lying wholly within the external surfaces of the wheel.

The enumerated and further objects of the invention will be best understood from the description of an illustrative embodiment thereof as shown in the accompanying drawings in which:

Fig. 3 is a view similar to Fig. 2 but showing the parts as they would appear in a mold prior to being compressed to final shape;

Figs. 4 and 5 are detail views of a bushing which may be employed; and

Figs. 6 and 7 are detail views of a collar employed.

Figure 1:
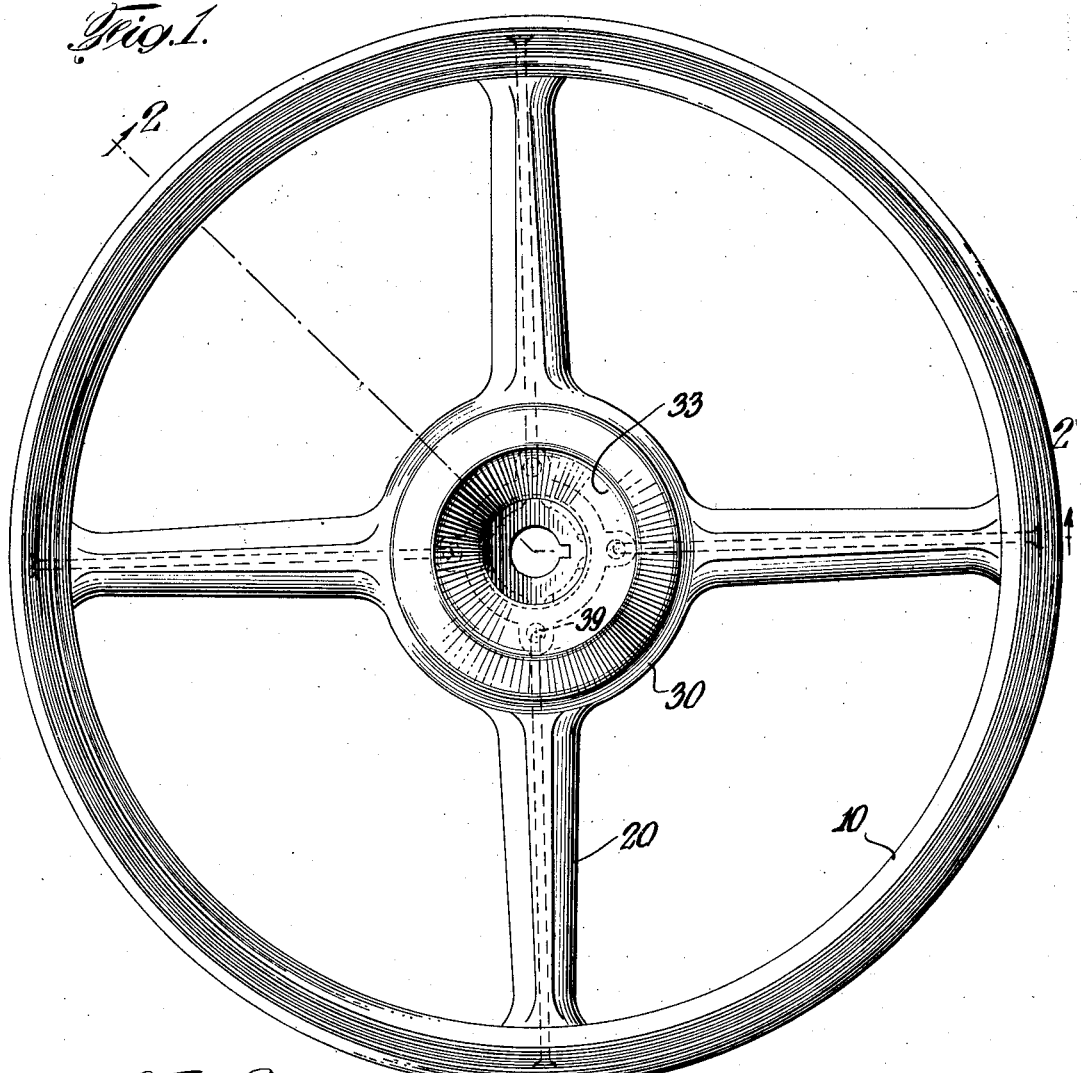
Fig. 1 is a top plan view of the completed wheel.
Figure 2:
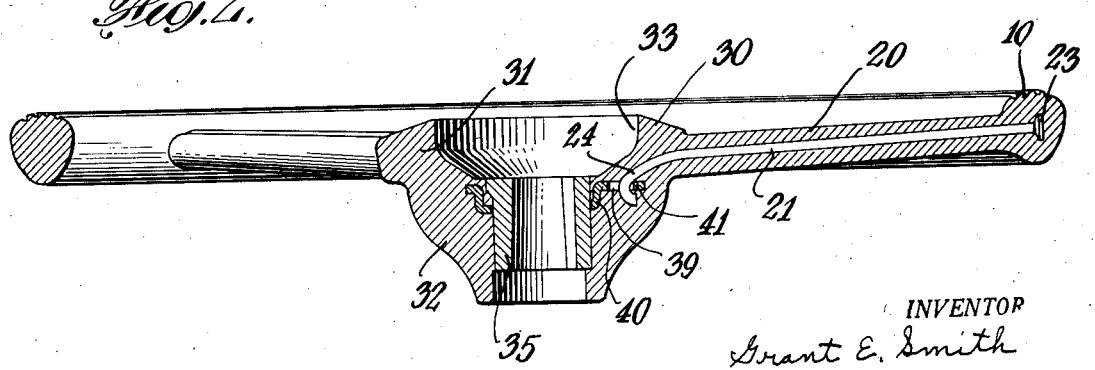
Fig. 2 is an axial section taken on the line 2—2 of Fig. 1.

The wheel in its completed form, as shown in Figs. 1 and 2, comprises a rim 10, spokes 20 and a hub 30, the hub including a body portion 31 embracing the inner ends of the spokes and an extension 32 axially offset with respect to the inner ends of the spokes. The extension 32 is provided with a bushing 35, preferably of metal, for securing the wheel to a shaft, for example, the steering shaft of an automobile.

An enlarged bore or recess 33 for the reception of parts appurtenant to the wheel may be formed in the hub at the end opposite that on which the hub extension 32 is formed. As illustrated, the bore 33 extends into the hub approximately to the lower edge of the spokes. There may also be an enlarged bore 36 formed in the hub extension 32 below the bushing 35 for the reception of other appurtenant parts, such, for example, as the upper end of a tube or steering column surrounding the steering shaft. A metal reinforcing member 21 extends throughout the length of each spoke, being embedded as a core within the spoke and at its outer end beyond the end of the spoke is provided with an enlargement 23 the better to secure it within the rim and prevent separation of the rim and spoke. At its inner end the reinforcing member 21 is bent down from the line of the spoke so as to enter the hub extension. As may be observed by comparing Fig. 3 with Fig. 2 this bending is largely accomplished by the compressing operation through the action of the plunger 52 employed to form the recess or enlarged bore 33.

Means is herein provided for tying the bushing to the spoke reinforcing members 21. This may be accomplished in various ways. A construction which has been found efficient and at the same time well suited for use in the molding and compressing operations incident to the manufacture of the wheel will now be described. A collar 37 fits closely about but slidably upon the bushing 35 and is provided with notches 38 adapted to fit over ribs 35a provided on the exterior surface of the bushing. If desired, the bushing may be formed with a flange 40 at its upper end to hold the collar in proper position when the parts are assembled for molding. The flange also serves to prevent axial movement or loosening of the bushing within the hub; while the ribs of the bushing being molded into the material composing the body of the hub prevent circumferential movement or loosening of the bushing within the hub.

The collar 37 is provided with a plurality of enlarged apertures 39 corresponding in number and position to the spokes of the wheel, and into these apertures the inner hooked ends 24 of the longitudinal spoke reinforcing member 21 extend. Upon reference to Fig. 3 which, as before stated, shows the assembly prior to compression, the hooks 24 are seen to be disposed adjacent the inner edges of the enlarged apertures 39, while in Fig. 2 the longitudinal reinforcing members 21 are found to be bent downwardly, the collar 37 to be slipped down the bushing 35 and the hooks 24 of the reinforcing members 21 to have moved along the apertures 39 until they substantially engage behind the outer walls 41 of the apertures. This arrangement permits easy and economical manufacture of parts and provides a wheel which when completed is smooth to the hand, of neat appearance and very rigid as a unit.

It is thus seen that a wheel structure consisting essentially or largely of moldable material which would be liable to certain weaknesses, is reinforced by a relatively light metal skeleton which until the body of moldable material is molded thereon has little rigidity and no utility as a wheel in itself. This type of wheel presents substantial problems in its manufacture, whereas no such problems exist in manufacturing the type of wheel comprising a self-sufficient metal frame over which a layer of moldable material is placed and merely molded to the shape of the finished wheel. The present invention has solved these problems and has provided a very inexpensive, easily manufactured and substantial wheel.

While a single specific embodiment of the invention has been described herein, it is not intended to define the limits of the invention and it will be apparent that various changes and modifications may be and are intended to be made within the scope of the subjoined claims.

What is claimed is:

1. A steering wheel comprising a molded rim, hub and spokes, said hub being formed with a hub extension axially offset with respect to the inner ends of the spokes and a central bore including a counterbore in the region of the inner ends of the spokes, a bushing in the hub extension, a flange on the end of the bushing adjacent the spokes, longitudinal splines on the outer surface of said bushing, a collar fitting over said bushing below the flange thereof and provided with apertures corresponding in number and position to said spokes, and metal reinforcing bars extending through said spokes from the rim into the hub extension, said bars having an enlargement at one end embedded within the rim and a hook at the other end entering the apertures of the collar and engaging the collar about the outer walls of the apertures, the thickness of the bars within said apertures being less than the radial extent of the apertures.

2. A steering wheel comprising a molded rim, hub, and spokes, said hub being formed with a hub extension axially offset with respect to the inner ends of the spokes and a central bore including a counterbore in the region of the inner ends of the spokes, a bushing in the hub extension, a flange on the bushing at the end adjacent the spokes, a collar fitting over said bushing below the flange thereof and provided with apertures corresponding in number and position to said spokes, and reinforcing bars extending through said spokes from the rim into the hub extension, said bars bearing an enlarged portion at one end embedded within the rim and an offset portion at the other end entering the apertures of the collar.

3. A steering wheel comprising integrally molded rim, spokes and hub, a bushing embedded in said hub for attaching the wheel to a shaft and metal reinforcing means embedded within the wheel and jointed to said bushing to tie it to said rim, said joint providing axial movement between the bushing and reinforcing means during molding.

4. A steering wheel comprising integrally molded hub and spokes, a metal bushing embedded in said hub for attaching the wheel to a shaft and metal reinforcing members embedded in said wheel and jointed to said bushing for transmitting strain from said bushing to said spokes whereby stresses on the molded material of the wheel are relieved, said joint providing axial movement between the bushing and reinforcing means during molding.

5. A steering wheel comprising a molded hub formed with an enlarged axial recess and a shaft attaching bushing embedded therein beyond the end of the recess, a laterally extending member borne by said bushing provided with oversized apertures, and radially extending bars bearing parts entering said apertures, the bars being adapted to be bent down during molding of the hub whereby the parts within the apertures move radially outward therein until they substantially engage the outer walls of the apertures.

6. A steering wheel comprising a molded hub formed with an enlarged axial recess and a shaft attaching bushing embedded therein beyond the end of the recess, a collar closely fitting said bushing, said collar provided with oversized apertures, and radially extending bars bearing parts entering said apertures, the bars being adapted to be bent down and said collar being adapted to slide upon said bushing during molding of the hub whereby the parts within the apertures move radially outward therein until they substantially engage the outer walls of the apertures.

7. The method of manufacturing a molded wheel so as to form integral spokes and hub with a bushing, collar and an axial recess in the hub and lateral hook-ended reinforcing bars connected with said collar, which comprises passing a collar with oversized flange apertures over said bushing to the upper end thereof and inserting the hooked ends of the lateral bars into the apertures of the collar where they will be disposed near the inner edges of the apertures, and compressing and molding the assembly to bend down the bars and slide the collar down the bushing until the hooked ends of the bars are approximately engaged with the outer walls of the elongated apertures.

8. The method of manufacturing a molded wheel which comprises hooking a spoke reinforcing member into the oversized apertures of a hub reinforcing member and molding the wheel to press the inner end of the spoke reinforcing member downward while it remains hooked in said aperture.

9. A wheel comprising a hub bushing, a thick hub covering of fibrous material impregnated with a phenolic condensation product molded over said busning, spoke reinforcing rods connected by means taking tensile strains from said bushing and spokes of fibrous material impregnated with a phenolic condensation product molded integrally with said hub.

10. A wheel comprising integrally molded spokes and hub each composed essentially of moldable material, and metallic members embedded in the moldable material of said spokes and hub to reinforce the same, said reinforcing members being connected together but loosely jointed and having little or no initial rigidity as a unit, this being imparted by the molding of the moldable material.

11. A wheel comprising integrally molded spokes and hub each composed essentially of moldable material, the hub including an enlarged cavity in line with the spokes and an axial extension by which it is secured to a torque shaft below the line of said spokes, and metallic members embedded in the moldable material of said spokes and hub to reinforce the same, said reinforcing members being connected together but loosely jointed and having little or no initial rigidity as a unit, this being imparted by the molding of the moldable material.

12. A wheel having a spider comprising integrally m lded hub and spokes, each composed almost entirely of moldable material, said hub being formed with a relatively large recess at one end to house operating mechanism and a hub extension at the other end, a central bushing molded into said extension for securing said spider to a shaft, and relatively light reinforcing members molded in said spider extending from within the spokes into the hub extension and connected by means taking tensile strains from said bushing, there being a separate and distinct member for each spoke having a separate attachment in said hub extension.

13. A wheel comprising integrally molded hub and spokes each composed largely of moldable material, a metal member molded in said hub, and reinforcing means connecting said members with said spokes, there being an adjustable connection between said hub member and said reinforcing means permitting relative movement therebetween during the molding operation.

14. A wheel comprising integrally molded hub and spokes each composed largely of moldable material, a metal member molded in said hub, and reinforcing means connecting said member with said spokes, said means including a ring on said member adapted to slip axially thereon during molding.

15. A wheel comprising integrally molded hub and spokes each composed largely of moldable material, a metal member molded in said hub, and reinforcing means connecting said member with said spokes, said means providing axial and radial adjustment between said hub member and said spoke members during molding.

16. The method of making a wheel having hub and spokes composed of moldable material of kind and amount entailing substantial shrinkage during molding, the hub comprising an enlarged hub cavity and an axial hub extension with a metallic reinforcing member in said hub extension and spoke reinforcing rods connected thereto, which method comprises making the reinforcing members relatively adjustable and molding the wheel under compressing and deforming pressure with heat to cause adjustment of said reinforcing members and to consolidate said moldable material thereover to form a strong, rigid wheel.

In testimony whereof, I have signed my name to this specification this 4th day of May, 1928.

GRANT E. SMITH.